(12) United States Patent
Lee et al.

(10) Patent No.: US 8,875,021 B2
(45) Date of Patent: Oct. 28, 2014

(54) VISUAL PLAYLIST

(71) Applicants: Verizon New Jersey, Inc., Newark, NJ (US); Verizon Patent and Licensing, Inc., Basking Ridge, NJ (US)

(72) Inventors: Woo Beum Lee, Basking Ridge, NJ (US); Michelle Felt, Randolph, NJ (US)

(73) Assignees: Verizon Patent and Licensing Inc., Basking Ridge, NJ (US); Verizon New Jersey Inc., Newark, NJ (US)

( * ) Notice: Subject to any disclaimer, the term of this patent is extended or adjusted under 35 U.S.C. 154(b) by 0 days.

(21) Appl. No.: 13/658,511

(22) Filed: Oct. 23, 2012

(65) Prior Publication Data
US 2014/0115465 A1   Apr. 24, 2014

(51) Int. Cl.
*G06F 3/00*   (2006.01)

(52) U.S. Cl.
USPC ........................................................ 715/716

(58) Field of Classification Search
CPC ........ G06F 3/0484; G06F 3/048; G11B 27/34
USPC ........................................................ 715/716
See application file for complete search history.

(56) References Cited

U.S. PATENT DOCUMENTS

| | | | |
|---|---|---|---|
| 6,400,366 B1 * | 6/2002 | Davies et al. | 345/440 |
| 8,071,869 B2 * | 12/2011 | Chen et al. | 84/612 |
| 8,291,350 B1 * | 10/2012 | Park et al. | 715/863 |
| 2002/0045960 A1 * | 4/2002 | Phillips et al. | 700/94 |
| 2006/0224259 A1 * | 10/2006 | Buil et al. | 700/94 |
| 2008/0163056 A1 * | 7/2008 | Lamadon | 715/716 |
| 2009/0013260 A1 * | 1/2009 | Martin et al. | 715/747 |
| 2009/0049342 A1 * | 2/2009 | Dickenson et al. | 714/45 |
| 2010/0282045 A1 * | 11/2010 | Chen et al. | 84/612 |
| 2011/0016394 A1 * | 1/2011 | DuKane | 715/716 |
| 2011/0234480 A1 * | 9/2011 | Fino et al. | 345/156 |
| 2012/0041954 A1 * | 2/2012 | Curtis et al. | 707/740 |
| 2013/0103617 A1 * | 4/2013 | Desai | 706/12 |

* cited by examiner

*Primary Examiner* — Steven Sax
*Assistant Examiner* — David Choi

(57) ABSTRACT

A device may receive information that identifies a first attribute and a second attribute associated with media files, and the first and second attributes may specify a manner in which the media files are to be represented on a user interface. The device may present, on the user interface and based on the first attribute and the second attribute, a representation of the media files on a grid. A first dimension of the grid may be associated with the first attribute, and a second dimension on the grid may be associated with the second attribute. The device may receive a selection of a portion of the grid corresponding to a set of media files, and may create a playlist, based on receiving the selection, that includes the set of media files.

20 Claims, 10 Drawing Sheets

VISUAL PLAYLIST

BACKGROUND

A music listener may use a device, such as a media player, to create a playlist of songs. A playlist may include a list of songs that can be played in sequential or shuffled (e.g., random) order. A music listener may create and store a playlist so that a series of desired songs (e.g., songs that create a particular musical atmosphere, songs of a particular style or a variety of styles, etc.) can be played without requiring continued user interaction.

DETAILED DESCRIPTION OF PREFERRED EMBODIMENTS

The following detailed description of example implementations refers to the accompanying drawings. The same reference numbers in different drawings may identify the same or similar elements.

As used herein, the terms "content" and "file" or "files" may be used interchangeably. In some implementations, a file may store and/or identify content. For example, a media file may store media content, an audio file may store audio content (e.g., a song), and a video file may store video content. Media content may include audio content and/or video content.

A music listener may use a user device, such as a media player, to create a playlist of songs. However, creating a playlist may be time-intensive as a user navigates through various folders and files to add songs to the playlist. Implementations described herein simplify the playlist creation process by allowing a user to create a playlist by selecting a representation of a song or a group of songs presented (e.g., displayed and/or provided) on a two-dimensional grid that categorizes songs based on a pair of attributes.

Figure 1:
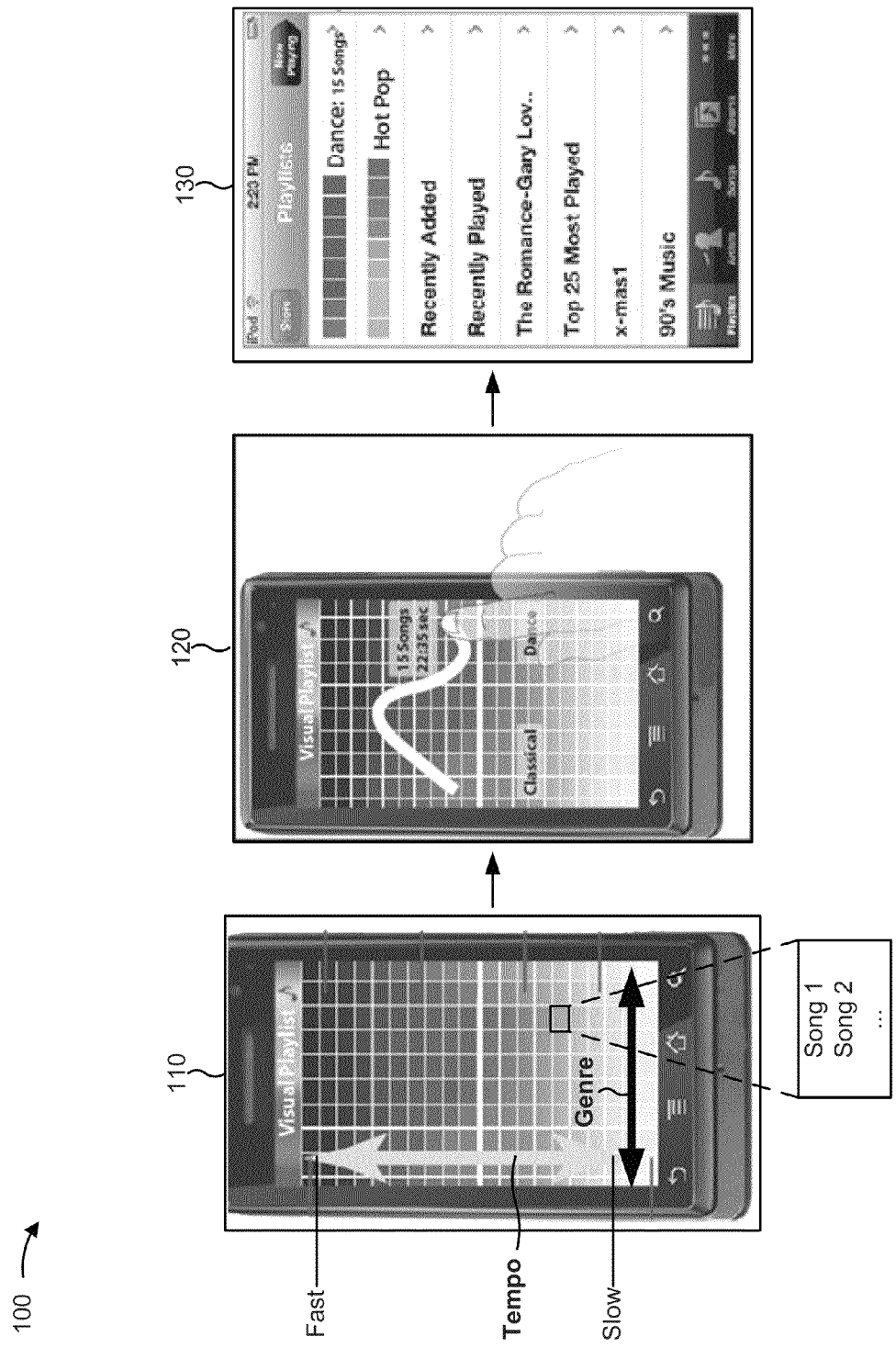
FIG. 1 is a diagram of an overview of an example implementation described herein.

FIG. 1 is a diagram of an overview of an example implementation 100 described herein. As illustrated in FIG. 1, a user may interact with a user device, such as a smart phone or a media player, to create a playlist. As shown in box 110, a song may be represented on a two-dimensional grid presented on a user interface, and a position of the song on the grid (e.g., a cell that represents the song) may be based on attributes of the song. A position on the grid (e.g., a cell) may correspond to a single song or a group of songs with particular attributes.

In implementation 100, the vertical axis of the grid represents a tempo of a song (e.g., a number of beats per minute), and a song may be represented at a position on the grid based on the tempo of the song. For example, a song with a fast tempo may be represented closer to the top of the grid than a song with a slow tempo. Likewise, a song with a slow tempo may be represented closer to the bottom of the grid than a song with a fast tempo.

In implementation 100, the horizontal axis of the grid represents a genre of a song (e.g., classical, dance, rock, pop, rap, top 20, etc.), and a song may be represented at a position on the grid based on the genre of the song. For example, a classical song may be represented closer to the left of the grid, and a dance song may be represented closer to the right of the grid.

As shown in box 120, a user may select one or more cells on the grid. For example, a user may use their finger on a touch screen interface to select one or more cells on the grid, as illustrated. Each cell selected by the user may represent one or more songs, and the represented songs may be added to a playlist, as shown in box 130. The user device may play the songs in the playlist.

Figure 2:
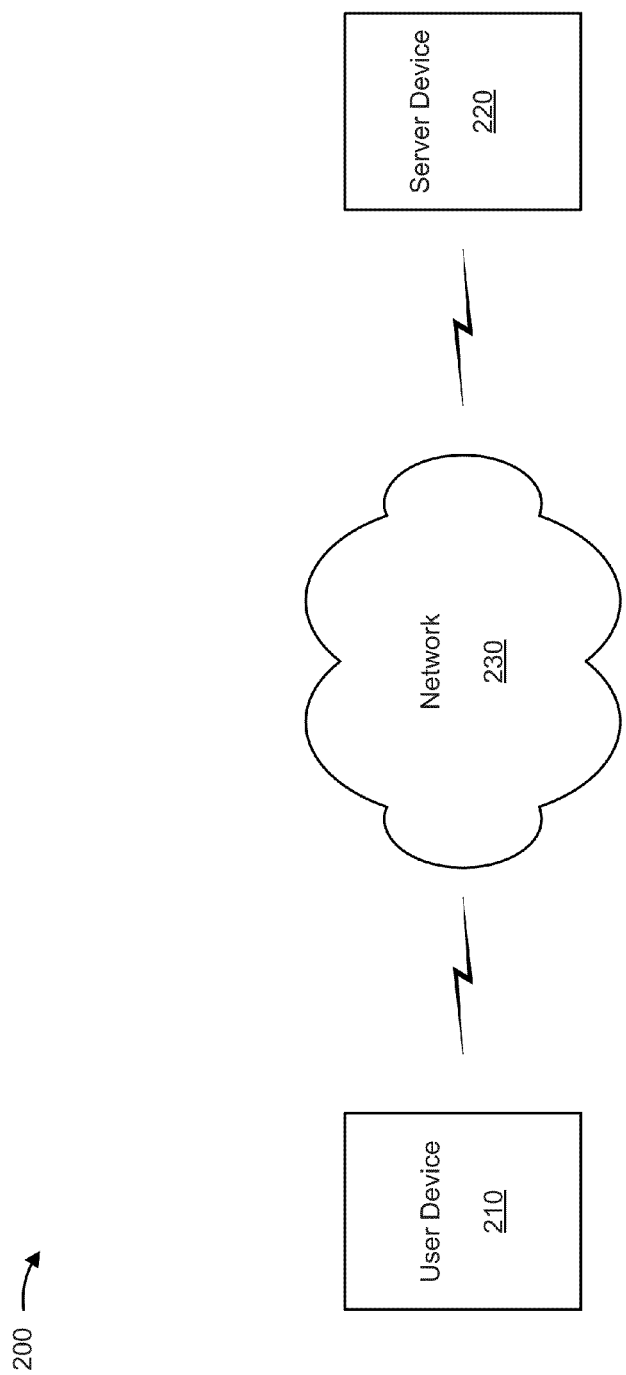
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a user device 210, a server device 220, and a network 230.

User device 210 may include a device capable of providing, presenting, and/or displaying information, storing information, and playing audio (e.g., songs), video, and/or other media content (such as files that contain audio content, video content, media content, etc.). For example, user device 210 may include a media player, a mobile phone (e.g., a smart phone, a radiotelephone, etc.), a computing device (e.g., a desktop computer, a laptop computer, a tablet computer, a handheld computer, etc.), a television, or a similar device. In some implementations, user device 210 may include a display that allows a user to provide input using a touch screen. Additionally, or alternatively, user device 210 may include a communication interface that allows user device 210 to receive information from and/or transmit information to server device 220.

Server device 220 may include one or more server devices, or other types of devices, that gather, process, search, store, and/or provide information in a manner described herein. In some implementations, server device 220 may provide media content (e.g., audio files, video files, media files, etc.) to user device 210. Additionally, or alternatively, server device 220 may provide information associated with media content, such as attributes of media content (e.g., tempo, genre, release date, etc.), to user device 210.

Network 230 may include one or more wired and/or wireless networks. For example, network 230 may include a cellular network, a public land mobile network ("PLMN"), a second generation ("2G") network, a third generation ("3G") network, a fourth generation ("4G") network, a fifth generation ("5G") network, a long term evolution ("LTE") network, and/or another network. Additionally, or alternatively, network 230 may include a local area network ("LAN"), a wide area network ("WAN"), a metropolitan area network ("MAN"), a telephone network (e.g., the Public Switched Telephone Network ("PSTN")), an ad hoc network, an intranet, the Internet, a fiber optic-based network, and/or a combination of these or other types of networks.

The number of devices and/or networks shown in FIG. 2 is provided for explanatory purposes. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, one or more of the devices of environment 200 may perform one or more functions described as being performed by another one or more devices of environment 200. Devices of environment 200 may interconnect via wired connections, wireless connections, or a combination of wired and wireless connections.

Figure 3:
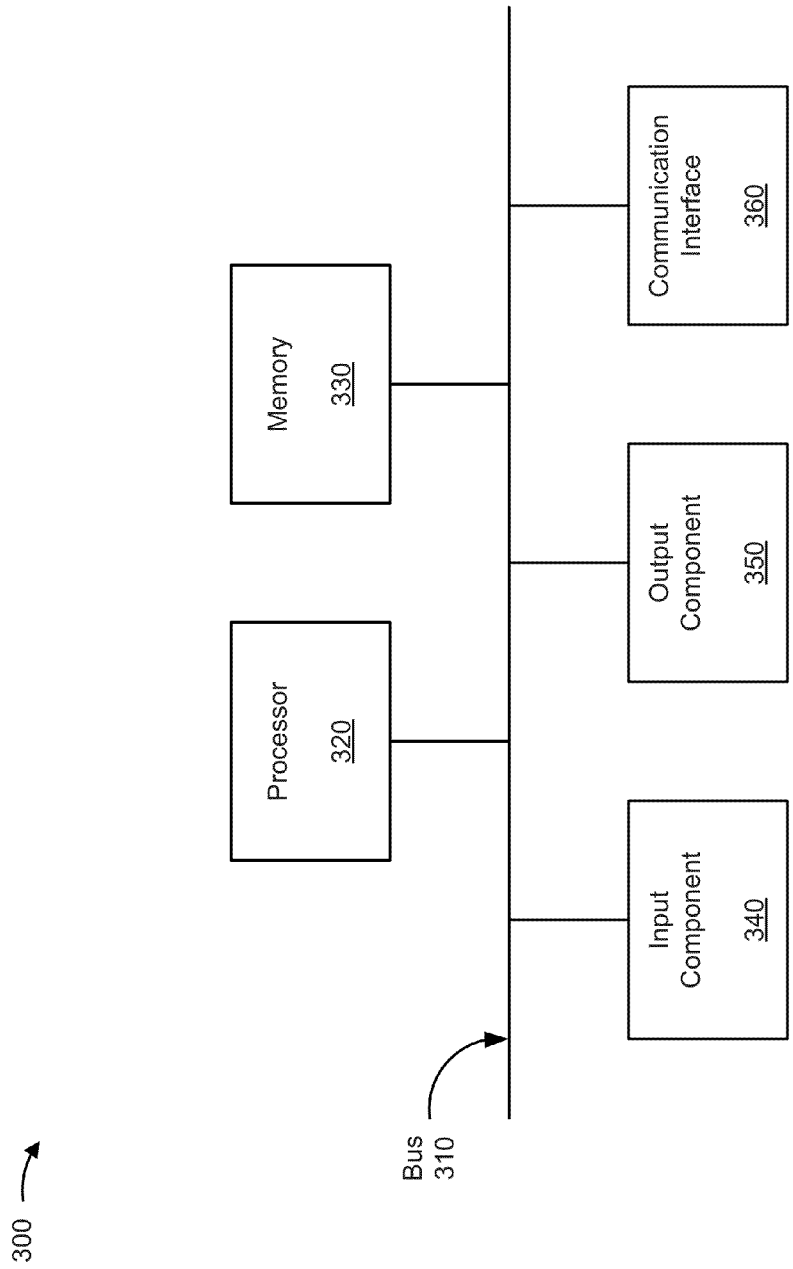
FIG. 3 is a diagram of example components of one or more devices of FIG. 2.

FIG. 3 is a diagram of example components of a device 300. Device 300 may correspond to user device 210 and/or server device 220. As illustrated in FIG. 3, device 300 may include a bus 310, a processor 320, a memory 330, an input component 340, an output component 350, and a communication interface 360.

Bus 310 may include a path that permits communication among the components of device 300. Processor 320 may include a processor (e.g., a central processing unit, a graphics processing unit, an accelerated processing unit), a microprocessor, and/or any processing logic (e.g., a field-programmable gate array ("FPGA"), an application-specific integrated circuit ("ASIC"), etc.) that interprets and/or executes instructions. Memory 330 may include a random access memory ("RAM"), a read only memory ("ROM"), and/or another type of dynamic or static storage device (e.g., a flash, magnetic, or optical memory) that stores information and/or instructions for use by processor 320.

Input component 340 may include a component that permits a user to input information to device 300 (e.g., a touch screen, a keyboard, a keypad, a mouse, a button, a switch, etc.). Output component 350 may include a component that outputs information from device 300 (e.g., a display, a speaker, one or more light-emitting diodes ("LEDs"), etc.).

Communication interface 360 may include a transceiver-like component, such as a transceiver and/or a separate receiver and transmitter, that enables device 300 to communicate with other devices, such as via a wired connection, a wireless connection, or a combination of wired and wireless connections. For example, communication interface 360 may include an Ethernet interface, an optical interface, a coaxial interface, an infrared interface, a radio frequency ("RF") interface, a universal serial bus ("USB") interface, or the like.

Device 300 may perform various operations described herein. Device 300 may perform these operations in response to processor 320 executing software instructions included in a computer-readable medium, such as memory 330. A computer-readable medium may be defined as a non-transitory memory device. A memory device may include space within a single storage device or space spread across multiple storage devices.

Software instructions may be read into memory 330 from another computer-readable medium or from another device via communication interface 360. When executed, software instructions stored in memory 330 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number of components shown in FIG. 3 is provided for explanatory purposes. In practice, device 300 may include additional components, fewer components, different components, or differently arranged components than those shown in FIG. 3. Additionally, or alternatively, each of user device 210 and/or server device 220 may include one or more devices 300 and/or one or more components of device 300.

Figure 4:
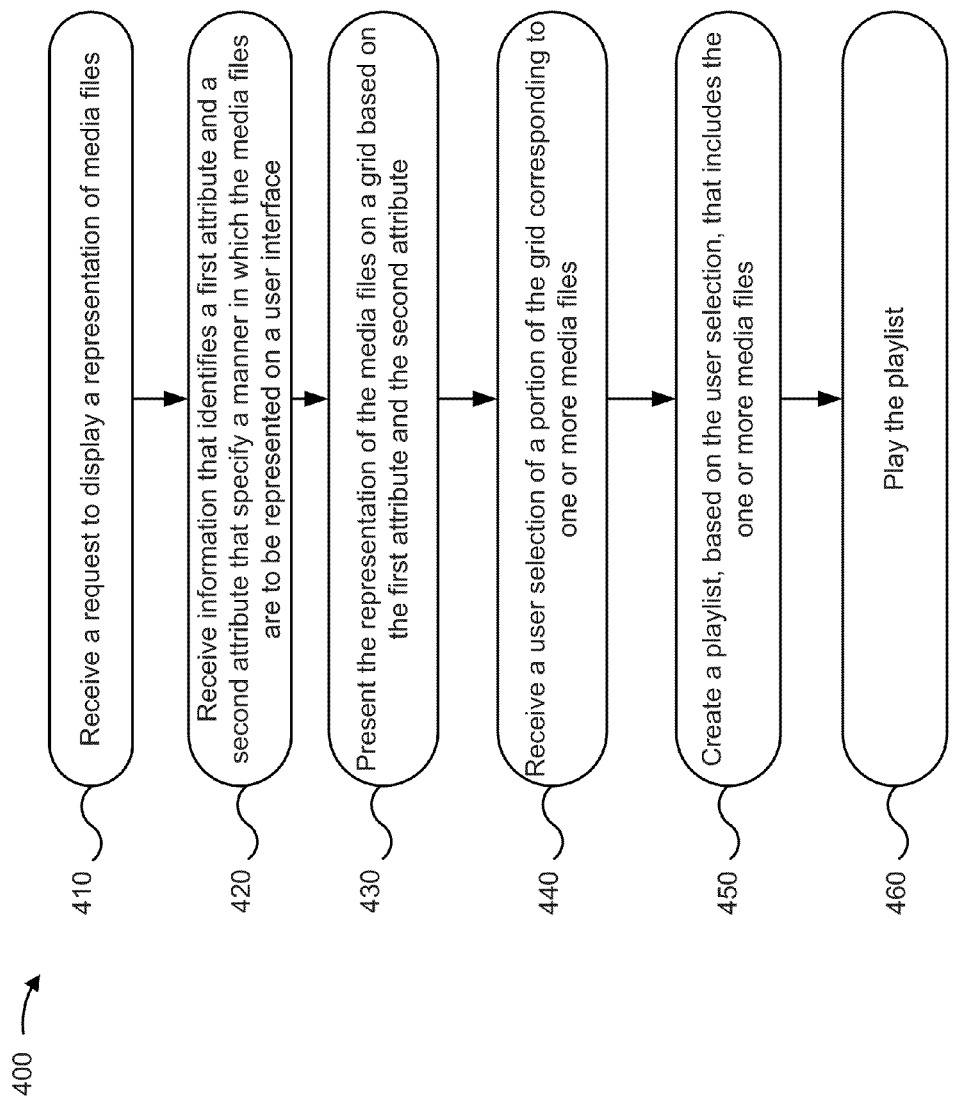
FIG. 4 is a flow chart of an example process for creating a playlist.

FIG. 4 is a flow chart of an example process 400 for creating a playlist. In some implementations, one or more process blocks of FIG. 4 may be performed by user device 210. Additionally, or alternatively, one or more process blocks of FIG. 4 may be performed by another device or a group of devices separate from or including user device 210, such as server device 220.

As shown in FIG. 4, process 400 may include receiving a request to display a representation of media files (block 410). In some implementations, user device 210 may receive the request from a user of user device 210 interacting with a user interface of user device 210. For example, a user may select an application (e.g., a Visual Playlist application, a media application, a playlist-creation application, etc.), which may initiate the request. In some implementations, the media files may be stored on user device 210 and/or server device 220.

Process 400 may include receiving information that identifies a first attribute and a second attribute that specify a manner in which the media files are to be represented on a user interface (block 420). In some implementations, user device 210 may receive the information from a user of user device 210 interacting with a user interface of user device 210. For example, a user may specify a first attribute to be represented along a first axis (e.g., a vertical axis, or y-axis), and may specify a second attribute to be represented along a second axis (e.g., a horizontal axis, or x-axis). User device 210 may present a grid on a user interface, with each cell and/or position on the grid corresponding to a first position (e.g., a y coordinate) along the first axis and a second position (e.g., an x coordinate) along the second axis. The positions along the axes may correspond to respective attribute values. Each cell on the grid may represent one or more media files having a first attribute value corresponding to the first position along the first axis, and having a second attribute value corresponding to the second position along the second axis.

The first and second attributes may identify information associated with a media file (e.g., an audio file, such as a song; a video file, such as a music video of a song, a movie, or a television program; etc.). For example, the first or second attribute may identify a tempo of a song (e.g., a quantity of beats per minute), a genre of a song (e.g., rock, rap, country, pop, dance, classical, comedy, talk, etc.), a release date of a song (e.g., a day, month, and/or year that the song was released), an artist associated with the song (e.g., a writer of the song, a singer of the song, a producer of the song, etc.), an album on which the song was released, a name of the song, a length of the song (e.g., in minutes and/or seconds), a voice frequency associated with the song (e.g., a high pitched voice, a low pitched voice, a male voice, a female voice, etc.), a mood associated with the song (e.g., warlike, obscure, sad, serious, pious, furious, joyful, splendorous, bright, peaceful, light, soft, rich, gentle, melancholy, etc.), a rating of the song (e.g., a user rating), a quantity of times that a user has selected the song for playback (e.g., a quantity of times user device 210 has played the song), a date that the user acquired and/or purchased the song, a date that the user last played the song, a country and/or geographic region associated with the song (e.g., a country of origin, a country of the artist of the song, etc.), a musical instrument type used in the song, and/or another attribute associated with the song and/or media file.

While the attributes are described above as being associated with songs, in some implementations, the attributes may be associated with a different type of media content, such as a video (e.g., a music video), a podcast, an audio recording other than a song, etc.

In some implementations, user device 210 may also receive information that identifies a granularity for an attribute, and the granularity may also specify a manner in which the media files are to be represented on the user interface. The granularity may indicate a manner in which song representations should be distributed into intervals along the axes. For example, a user may specify that tempo is to be presented along a vertical axis, and may specify a granularity, for the tempo, of 20 beats per minute ("bpm"). When presenting the representation of the songs, user device 210 may group songs along the vertical axis based on the specified granularity of 20 bpm. For example, songs with a tempo of 81-100 bpm may be represented at a first position along the vertical axis (e.g., at a bottom position), songs with a tempo of 101-120 bpm may be represented at a second position along the vertical axis (e.g., higher than the first, bottom position), and songs with a tempo of 121-140 bpm may be represented at a third position along the vertical axis (e.g., higher than the second position).

When the attribute is genre, the granularity may specify a quantity of genres to group together. For example, when a user selects a granularity of two for a genre attribute, user device 210 may group two similar genres together (such as rap and hip-hop, rock and classic rock, dance and pop, etc.). Similarly, when the attribute is mood, the granularity may specify a quantity of moods to group together. For example, when a user selects a granularity of three for a mood attribute, user device 210 may group three similar moods together (such as light, soft, and peaceful; sad, serious, and melancholy; joyful, bright, and splendorous, etc.). In some implementations, the user may categorize the songs into genres and/or moods, and may specify the genres and/or moods to be presented (and/or the order in which the genres and/or moods are presented along the axes).

When the attribute is release date, the granularity may specify a quantity of years, months, etc. to group together. For example, when a user selects a granularity of 10 years for a release date attribute, user device 210 may group songs released in the same decade (e.g., songs released in the 1970s, 1980s, 1990s, etc.). Similarly, when the attribute is a date that the user acquired, purchased, or last played the song, the granularity may specify a quantity of years, months, etc. to group together. For example, when a user selects a granularity of 1 month for an attribute of last playback of a song, user device 210 may group songs played in the past month, songs played between one and two months in the past, etc.

When the attribute is song length, the granularity may specify a length of a song in minutes and/or seconds. For example, when a user selects a granularity of 30 seconds for a song length attribute, user device 210 may group songs with a length that falls into 30 second time intervals (e.g., songs between 3 minutes and 3 minutes 30 seconds in length, songs between 3 minutes 30 seconds and 4 minutes in length, etc.).

When the attribute is artist name, album name, or song name, the granularity may specify a quantity of letters that start the artist name, album name, or song name. For example, when a user selects a granularity of two letters for an artist name attribute, user device 210 may group songs by artists whose name falls into two letter intervals (e.g., may group artists whose names start with A and B, such as AC/DC, Aerosmith, Beastie Boys, the Beatles, etc.; may group artists whose names start with C and D, such as Coldplay, Creedence Clearwater Revival, Dave Matthews Band, DMX, etc.).

When the attribute is voice frequency, the granularity may specify a frequency range. For example, when a user selects a frequency range of 100 Hertz, user device 210 may group songs with a voice frequency that falls into 100 Hertz intervals (e.g., between 1000 Hertz and 1100 Hertz, between 1100 Hertz and 1200 Hertz, etc.).

When the attribute is a song rating, the granularity may specify a rating range. For example, when a user selects a rating range of two, user device 210 may group songs with a rating between one and two, a rating between three and four, etc. In some implementations, the user may specify a quantity of rating categories, and user device 210 may separate the songs into the rating categories based on a user rating.

When the attribute is a quantity of times that the song has been played, the granularity may specify a quantity range. For example, when a user selects a quantity range of ten, user device 210 may group songs that have been played between 1 and 10 times, between 10 and 20 times, etc. In some implementations, the user may specify a quantity of categories for the number of times played, and user device 210 may separate the songs into the categories based on the quantity of times that each song has been played.

When the attribute is a geographic region, the granularity may specify a size of the geographic region. For example, a user may specify to group songs by city, country, continent, hemisphere, etc.

In some implementations, user device 210 may receive the attributes and/or granularities from a data structure (e.g., stored locally on user device 210 or obtained from another device over a network, such as server device 220). Additionally, or alternatively, user device 210 may analyze media files to determine the attributes (e.g., beats per minute, voice frequency, etc.) and/or granularities (e.g., based on the entire range of attribute values associated with a particular attribute). Additionally, or alternatively, user device 210 may obtain the attributes from metadata associated with the media files. Additionally, or alternatively, a user may input, to user device 210, the attributes and/or granularities associated with the media files.

Returning to FIG. 4, process 400 may include presenting the representation of the media files on a grid based on the first attribute and the second attribute (block 430). In some implementations, user device 210 may present (e.g., display) a representation of a song on a two-dimensional grid on a user interface of user device 210. Each position on the grid may represent one or more songs with particular attribute values. For example, a particular vertical position on the grid (e.g., a row) may represent songs with a tempo that falls within a particular range (e.g., 140 bpm to 160 bpm). As another example, a particular horizontal position on the grid (e.g., a column) may represent songs of a particular genre (e.g., classical, dance, etc.). Thus, each cell (e.g., combination of vertical position and horizontal position, or row and column) in the grid may represent a song or group of songs having two particular attribute values (e.g., classical songs with a tempo of 140-160 bpm).

Each cell may represent a single song, a group of songs (e.g., in the scenario where multiple songs meet the attribute values specified by the cell position), or no songs (e.g., in the scenario where no songs meet the attribute values specified by the cell position). A cell may be represented by a square, a rectangle, a point where a row meets a column, an icon, a color, an image, etc. In some implementations, a cell may be represented by an image that conveys additional information about the song or songs represented by the cell, such as an image associated with an attribute of the songs represented by the cell (e.g., an image that represents a particular genre of music, a flag of a country where the song originated, etc.) and/or an image associated with an attribute of a portion of the songs represented by the cell (e.g., an image of an artist that sings some, all, or a majority of the songs represented by the cell). In some implementations, a cell that is frequently selected by a user (e.g., greater than a threshold quantity of times and/or more often than other cells) may be represented in a different manner than other cells (e.g., highlighted, presented in a different color, etc.).

In some implementations, the media files may be arranged in another shape other than a grid, so long as the media files are presented in relation to one another, based on the attributes. For example, rather than each cell being square or rectangular in shape, each cell may be a dot, a circle, a diamond, an oval, a heart, a different color, etc. In some implementations, the cells of the grid may not be visible, and different positions on a user interface and/or display may be associated with different cells and/or songs. For example, the grid may be hidden under an image, such as a rainbow with dark colors in one corner and light colors in the opposite, diagonal corner. Additionally, or alternatively, the grid may be arranged along two dimensions other than a vertical dimension and a horizontal dimension (e.g., two diagonal dimensions forming an X). In some implementations, the grid may be represented by a transition in color from one cell to another. For example, each column (or row) of cells may be presented in a different color (e.g., a different red, green, and blue color combination to produce any color capable of being displayed on user device 210), and each row (or column) of cells may be presented as a different shade (e.g., lighter or darker) of that color.

As further shown in FIG. 4, process 400 may include receiving a user selection of a portion of the grid corresponding to one or more media files (block 440). In some implementations, user device 210 may receive a user selection of a portion of the grid, such as one or more cells of the grid. For example, a user may select one or more cells by clicking on the cells (e.g., using a mouse or another input device), by clicking and dragging across multiple cells, by touching a screen location at which the cells are displayed and/or presented (e.g., using a finger or a pointer on a touch screen), by swiping across multiple cells displayed and/or presented on the screen (e.g., on a touch screen), etc.

In some implementations, information associated with the selected songs may be presented on the screen as a user selects the songs. For example, user device 210 may present one or more attributes of the selected songs. Additionally, or alternatively, user device 210 may present a quantity of selected songs, a combined length of the selected songs (e.g., a sum of the lengths of each selected song), an attribute associated with a majority of the selected songs, etc.

Process 400 may also include creating a playlist, based on the user selection, that includes the one or more media files (block 450). For example, user device 210 may receive the user selection of one or more songs, and may create a playlist that includes the songs. In some implementations, the songs may be placed in order in the playlist based on the order in which the songs were selected by the user. For example, the user may select a first cell before selecting a second cell (e.g., may swipe across a first cell and then a second cell). User device 210 may order the songs in the playlist by placing the songs represented by the first cell before the songs represented by the second cell. Additionally, or alternatively, a user may specify that the songs are to be played in a random order, and user device 210 may randomize the order of the songs in the playlist.

In some implementations, a cell may represent more than one song. For example, the first cell may represent 3 songs and the second cell may represent 4 songs. In this scenario, user device 210 may randomly order the 3 songs represented by the first cell in slots 1-3 of the playlist, and may randomly order the 4 songs represented by the second cell in slots 4-7 of the playlist. By placing songs in this order, user device 210 ensures that each song represented by the first cell is placed in order in the playlist before each song represented by the second cell.

Alternatively, user device 210 may place the songs represented by each cell in order based on a trend associated with the user selection. For example, the user may select a first cell that represents 2 songs before selecting a second cell that represents 2 different songs. The first cell may represent songs with a tempo between 120-140 bpm, and the second cell may represents songs with a faster tempo, between 140-160 bpm. User device 210 may determine a trend based on the order of user selection. For example, user device 210 may determine that the user has selected songs in order of increasing tempo (e.g., from 120-140 bpm to 140-160 bpm). Based on the trend, user device 210 may order the songs in the playlist in order of increasing tempo. For example, the 2 songs represented by the first cell may have a tempo of 125 bpm and 130 bpm, and the 2 songs represented by the second cell may have a tempo of 140 bpm and 155 bpm. Based on the determined trend of increasing tempo, user device 210 may place the 125 bpm song first, the 130 bpm song second, the 140 bpm song third, and the 155 bpm song fourth. In a scenario where two or more songs have the same tempo (or other attribute), user device 210 may randomly order those songs in the playlist.

As shown in FIG. 4, process 400 may include playing the playlist (block 460). In some implementations, after user device 210 has created the playlist, the playlist may be automatically played without receiving additional input from a user. Alternatively, user device 210 may create the playlist, and may play the playlist based on receiving user input to play the playlist.

While a series of blocks has been described with regard to FIG. 4, the blocks and/or the order of the blocks may be modified in some implementations. Additionally, or alternatively, non-dependent blocks may be performed in parallel.

Figure 5:
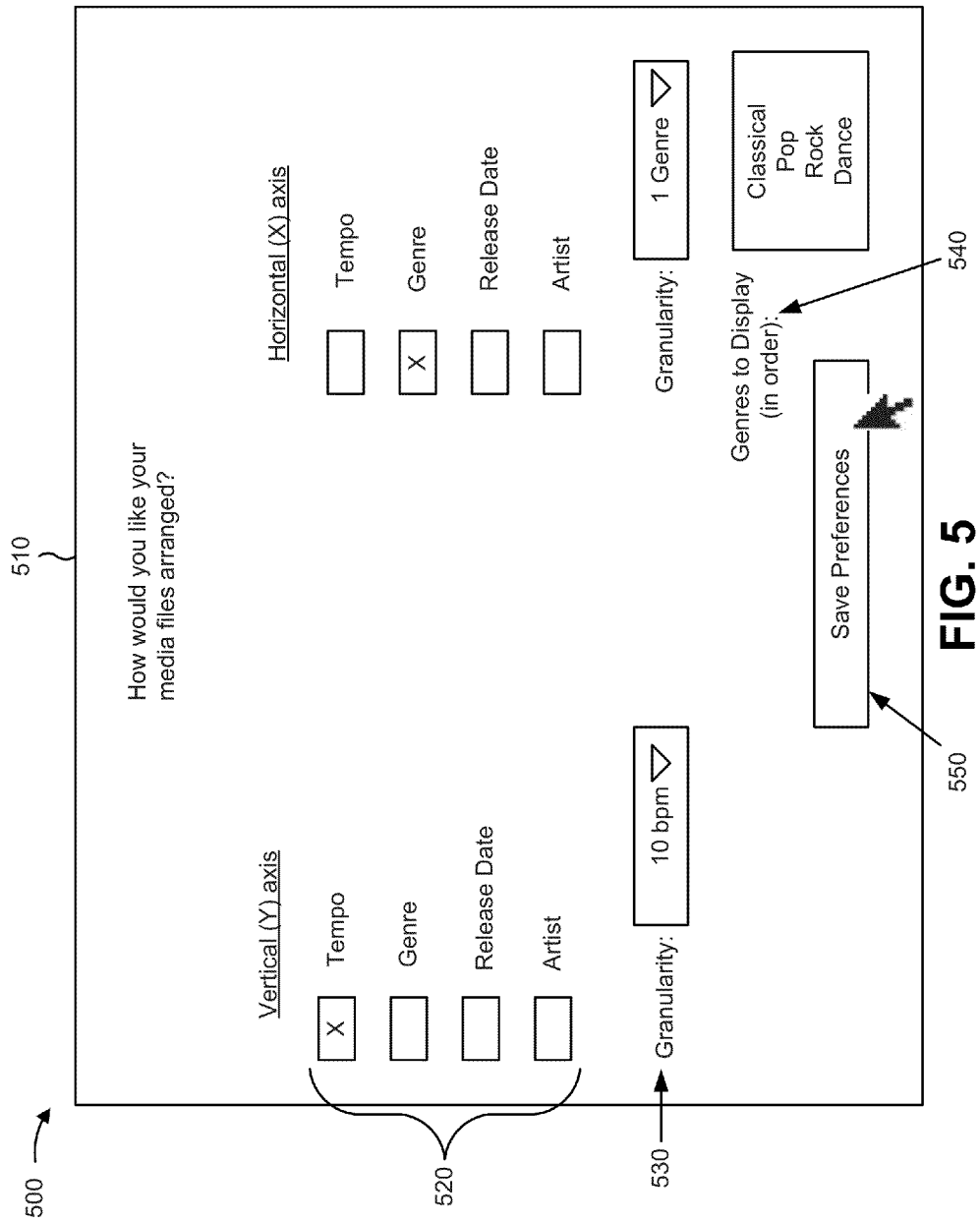
FIGS. 5-10 are diagrams of example implementations relating to the process shown in FIG. 4.

FIG. 5 is a diagram of an example implementation 500 relating to process 400 shown in FIG. 4. FIG. 5 depicts a user interface 510 that may be presented on user device 210. A user may interact with user interface 510 to specify attributes that determine how media files (e.g., songs) are to be represented on a display of user device 210, such as by specifying attributes to associate with a vertical axis and a horizontal axis (520), a granularity for the attributes (530), and particular attribute values and an order in which to present the attribute values along the axes (540).

As shown by reference number 520, a user may select a first attribute of a song to be represented along a first dimension (e.g., a vertical axis), and a second attribute of a song to be represented along a second dimension (e.g., a horizontal axis). For example, the user may select tempo to be presented along a vertical axis, and may select genre to be presented along a horizontal axis. In some implementations, user interface 510 may prevent a user from selecting the same attribute for more than one axis. As shown by reference number 530, the user may also select a granularity for the attributes, such as 10 bpm for the tempo attribute and 1 genre for the genre attribute. As shown by reference number 540, a user may select particular attribute values and/or an order in which to present the particular attribute values on a user interface, such as classical, pop, rock, and dance genres. The attribute values may include the set of values, for a particular attribute, that can be associated with a song.

As shown by reference number 550, the user may provide input (via an input element, such as a button, a menu item, etc.) to user interface 510 that saves the selected attributes and granularities, and that uses the selected attributes and granularities to represent media files when a playlist creator application is launched. In some implementations, selection of the input element may cause the playlist creator application to be launched.

Figure 6:
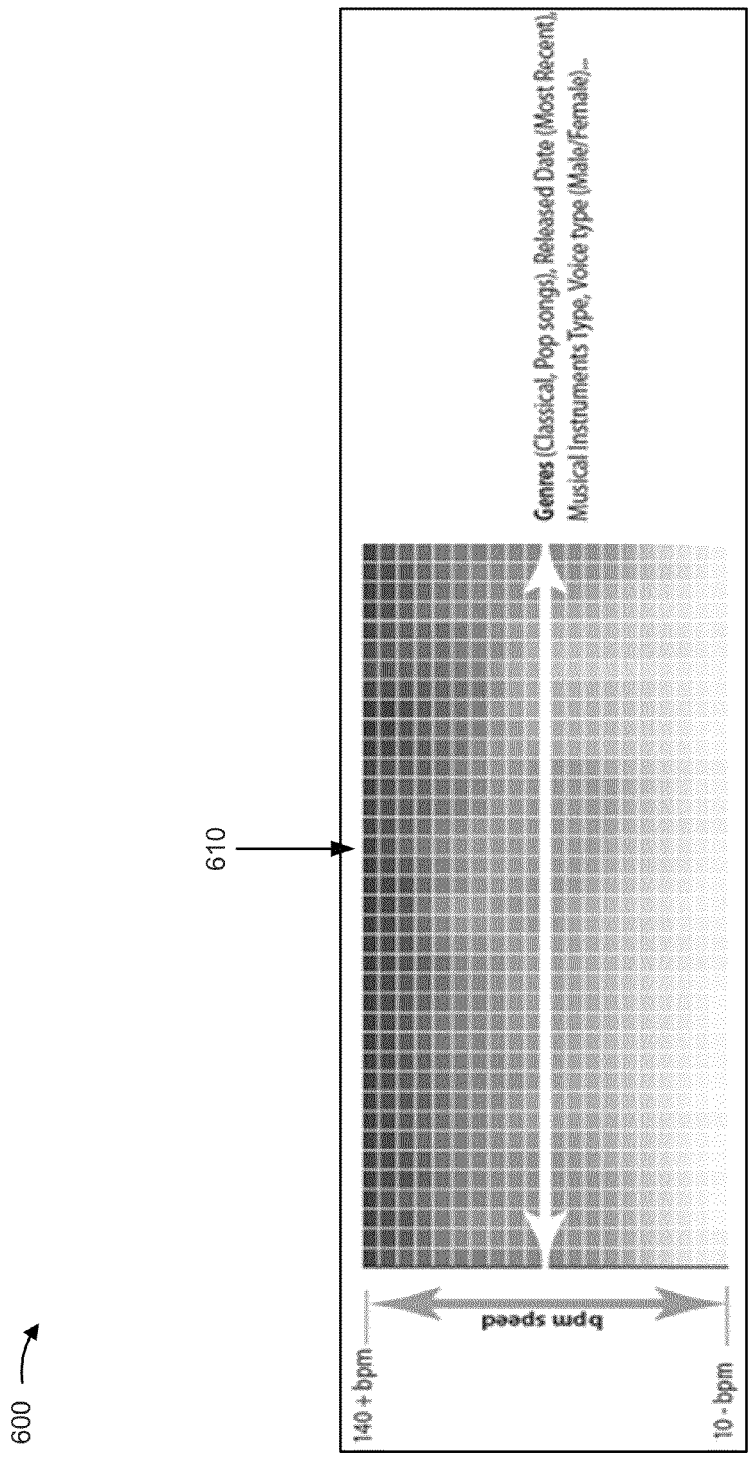

FIG. 6 is a diagram of an example implementation 600 relating to process 400 shown in FIG. 4. FIG. 6 depicts a user interface 610 that may be presented on user device 210, and which may be used to select media files to play and/or add to a playlist.

As shown in FIG. 6, user interface 610 may present a two-dimensional grid of rows and columns that create cells. In some implementations, the rows and columns may be presented horizontally and vertically. In other implementations, the rows and columns may be oriented in another manner (e.g., diagonally in a diamond shape). Each cell may represent one or more songs associated with a first attribute value and a second attribute value.

In example implementation 600, the cells may be arranged on the grid based on the genre of the songs that the cells represent. For example, each column of cells may represent songs classified in a particular genre or group of genres. A user may input (e.g., via user interface 510) the genres to be presented and the order in which the genres are to be presented (e.g., from left to right, top to bottom, etc.) on user interface 610. As shown in FIG. 6, the user may select a set of attributes separate from or including genre to present on user interface 610, such as a tempo of a song (e.g., a bpm speed), a release date of a song, a musical instrument type used in a song, a voice type of the vocals for the song, etc.

In example implementation 600, the cells may also be arranged on the grid based on the tempo (e.g., in beats per minute) of the songs that the cells represent. For example, cells representing songs with a slow tempo (e.g., 10 or fewer bpm) may be represented toward the bottom of user interface 610 and/or the grid, and cells representing songs with a fast tempo (e.g., 140 or more bpm) may be represented toward the top of user interface 610 and/or the grid.

The granularity input by the user may determine the difference in tempo between songs represented in adjacent rows. For example, the user may input a granularity of 10 bpm. Based on this input granularity, user interface 610 may present cells representing songs with a tempo of 10 or fewer bpm in a bottom row, cells representing songs with a tempo of 11-20 bpm in a second row (e.g., second from the bottom and immediately above and adjacent to the bottom row), cells representing songs with a tempo of 21-30 bpm in a third row (e.g., third from the bottom and immediately above and adjacent to the second row), etc. Cells that are aligned in the same row may represent songs with the same or a similar tempo.

In some implementations, user interface 610 may present cells based on a default granularity. For example, user device 210 may use a default granularity when a user does not input a granularity or when a user-input granularity results in too few or too many rows/columns (e.g., less than or greater than a threshold). In some implementations, user device 210 may determine the default granularity based on a range of attribute values and a quantity of cells that fit within user interface 610 (e.g., on the grid). For example, the songs in a user's library (e.g., stored on user device 210 or accessible by user device 210 via a network, such as from server device 220) may range in tempo from 10 bpm to 140 bpm. User device 210 may determine that user interface 610 is capable of presenting 20 rows of cells, and may evenly divide the attribute value range (10 bpm through 140 bpm) into the 20 rows. For example, user device 210 may determine the quantity of attribute values and/or the difference between the highest and lowest value in the range (here, 140−10=130), and may divide that quantity (130) by the quantity of cells (20) to determine an interval value for the default granularity (6.5). Each row may represent songs with a tempo that falls within an interval determined by the interval value. For example, the bottom row may represent songs with a tempo between 10 bpm and 16.5 bpm, the second row may represent songs with a tempo between 16.5 bpm and 23 bpm, etc. Either of the values on each end of the interval may be inclusive or exclusive.

Similarly, user device 210 may determine a default granularity by determining the total quantity of attribute values and dividing by the quantity of cells capable of being presented on user interface 610. For example, the songs in a user's library may be classified into 40 genres, and user interface 210 may be capable of presenting 20 columns of cells. User device 210 may divide the quantity of attribute values (40 genres) by the quantity of cells (20 cells) to determine the interval value for the default granularity (2 genres). Based on the default granularity, each column of cells on user interface 610 represents 2 genres of songs.

User device 210 may determine the quantity of cells that fit on user interface 610 based on a cell size. In some implementations, the cell size may be selected by a user. Additionally, or alternatively, the cells may have a minimum size and/or a maximum size. For example, the minimum and/or maximum cell size may be based on a display resolution of user device 210, a type of user device 210, an input method (e.g., touch screen or mouse pointer) for user device 210, a screen or display size of user device 210, a size of user interface 610, or other display characteristics of user device 210 and/or user interface 610.

Additionally, or alternatively, user device 210 may determine the quantity of cells that fit on user interface 610 based on a user interface size. In some implementations, user interface 610 may be the same size as a display of user device 210 (e.g., may take up the entire display). Alternatively, user interface 610 may be smaller than the display of user device 210 (e.g., may take up a portion of the display). User interface 610 may be resized, which may cause user device 210 to adjust the cell size, the quantity of cells that fit on user interface 610, and/or the granularity. In some implementations, user interface 610 may be larger than the display of user device 210, and may require the user to scroll to access different portions of user interface 610, as discussed herein in connection with FIG. 7.

Figure 7:
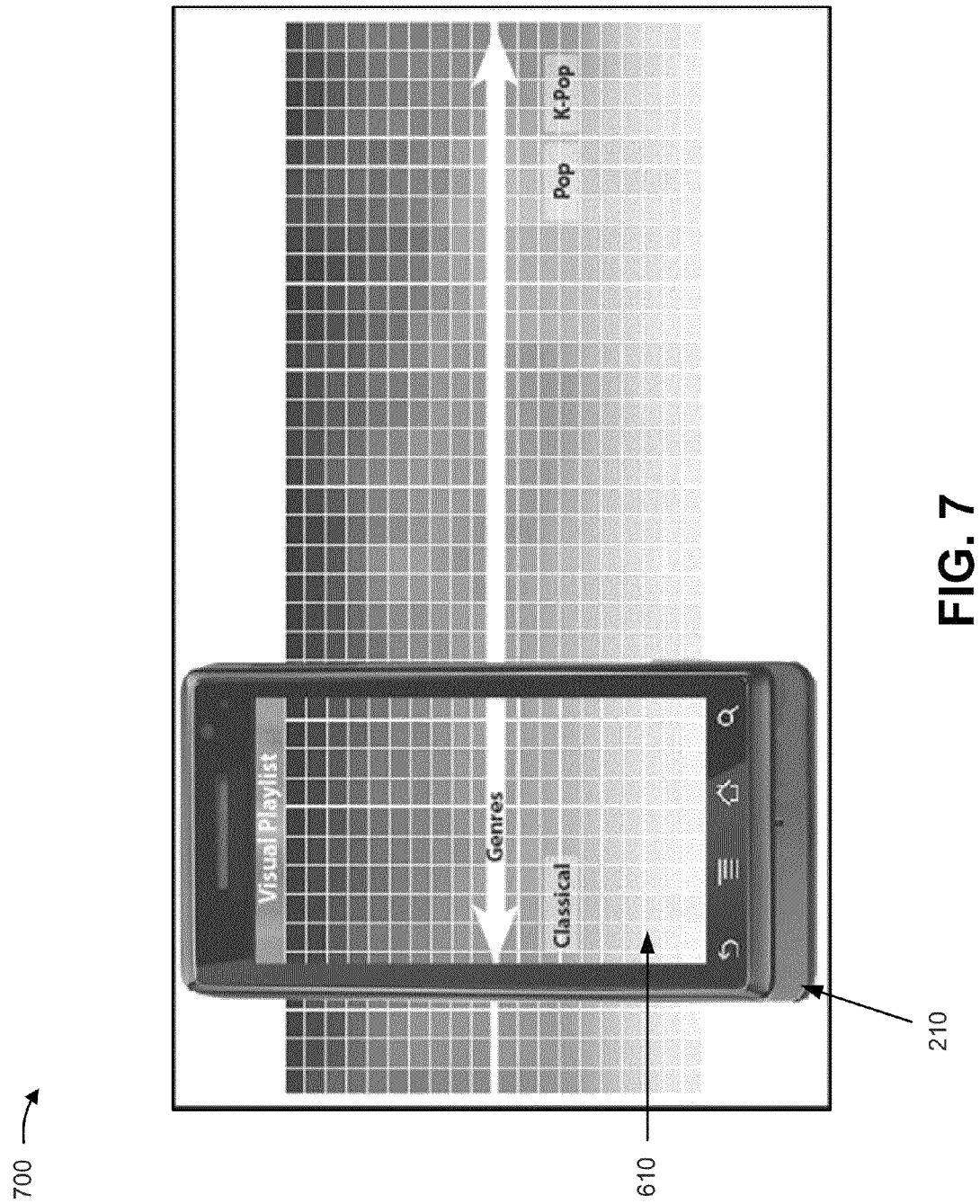

FIG. 7 is a diagram of an example implementation 700 relating to process 400 shown in FIG. 4. FIG. 7 depicts user interface 610 presented on user device 210.

As shown in FIG. 7, user interface 610 may be larger than the display of user device 210, and may require the user to scroll to access different portions of user interface 610. For example, the songs in a user's library may be classified into a quantity of genres larger than a quantity of columns (or rows) of cells that can fit on user interface 610. In this implementation, the user may scroll (e.g., left and right, up and down, etc.) to access different portions of user interface 610.

User device 210 may detect a different type of user input used for scrolling through user interface 610 than used for selecting cells that represent songs to be added to a playlist. For example, a user may swipe (e.g., without first touching and holding or touching and waiting for feedback) across the screen of user device 210 to scroll across user interface 610. Alternatively, this input method may be used to select songs.

Additionally, or alternatively, the user may touch and hold (e.g., maintain contact) with the screen of user device 210 before swiping in order to select songs to be added to a playlist. In some implementations, user device 210 may provide feedback to the user that indicates that a swipe will select songs rather than scroll. For example, the user may touch and hold, and the screen of user device 210 may flash, change color, display a prompt, etc. to indicate that a swipe will select songs. Additionally, or alternatively, user device 210 may emit a sound (e.g., a buzz, a beep, etc.), may vibrate, etc. to indicate that swipe will select songs. Alternatively, this input mechanism may be used to scroll across user interface 610. In some implementations, user interface 610 may scroll, as a user is selecting songs, when an input mechanism (e.g., a finger, a cursor, etc.) approaches an edge of user interface 610.

In some implementations, a user may zoom in or zoom out on user interface 610 (e.g., using an input mechanism such as a mouse, a finger, etc.). When the user zooms in on a group of cells, each cell in the group may increase in cell size. This may allow user interface 610 to present additional information associated with the songs represented by each cell (e.g., images and/or text that identify song names, artists, albums, etc., associated with the songs).

Additionally, or alternatively, zooming in on a group of cells may decrease the granularity of the attribute value interval. For example, user interface 610 may arrange cells by tempo according to a granularity of 20 bpm, and each cell may represent songs with a tempo that falls within a 20 bpm interval. A user may zoom in on two cells that represent the interval from 100-120 bpm and 120-140 bpm, respectively. Based on zooming in, user device 210 may change the granularity of each cell so that each cell represents songs with a tempo that falls within a 5 bpm interval (e.g., 100-105 bpm, 105-110 bpm, 115-120 bpm, 120-125 bpm, 125-130 bpm, 130-135 bpm, and 135-140 bpm). User device 210 may adjust the granularity so that the cells fit within user interface 610. In some implementations, user device 210 may allow a user to continue to zoom in until each cell represents a single song. User device 210 may perform similar but opposite operations when a user zooms out of user interface 610.

In some implementations, user interface 610 may provide a mechanism (e.g., a button, a menu item, etc.) for a user to access user interface 510, or another similar user interface, to change preferences such as attributes, granularity, the presented attribute values, the order of the presented attribute values, etc.

Figure 8:
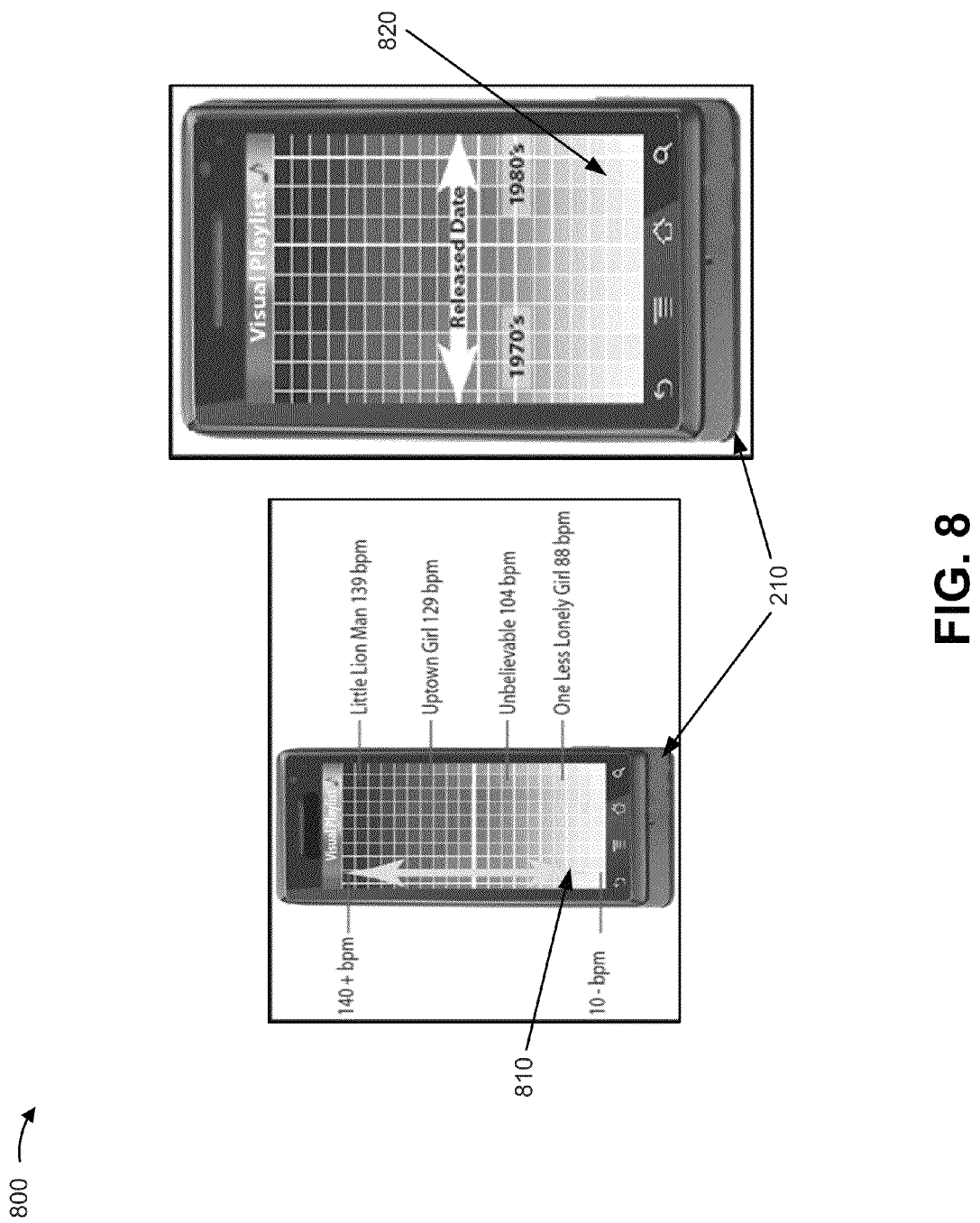

FIG. 8 is a diagram of an example implementation 800 relating to process 400 shown in FIG. 4. FIG. 8 depicts user interfaces 810 and 820 that may be presented on user device 210. In some implementations, user interfaces 810 and 820 may correspond to and/or provide similar functionality as user interface 610.

User interface 810 shows an example of four songs, each with a different tempo, represented by cells on user interface 810. The songs with a slower tempo are represented by cells on one end of the grid (e.g., the bottom), and the songs with a faster tempo are represented by cells on the other end of the grid (e.g., the top). The songs may each be represented by a different cell, or multiple songs may be grouped together to be represented by the same cell, depending on the granularity. The songs may be in the same genre, and may be represented in the same column.

User interface 820 shows an example of arranging cells based on a release date of songs represented by the cells. For example, each column of cells may represent songs released in a particular year or span of years (or a particular month, span of months, week, span of weeks, day, span of days, etc.). A user may input (e.g., via user interface 510) the release date values to be presented and the order in which the release date values are presented (e.g., from left to right, top to bottom, etc.) on user interface 610. In some implementations, the release dates may be presented chronologically (e.g., from left to right, as shown). Alternatively, a user may specify a different order for the release dates to be presented, and/or may choose release dates to include or exclude from the user interface.

Figure 9:
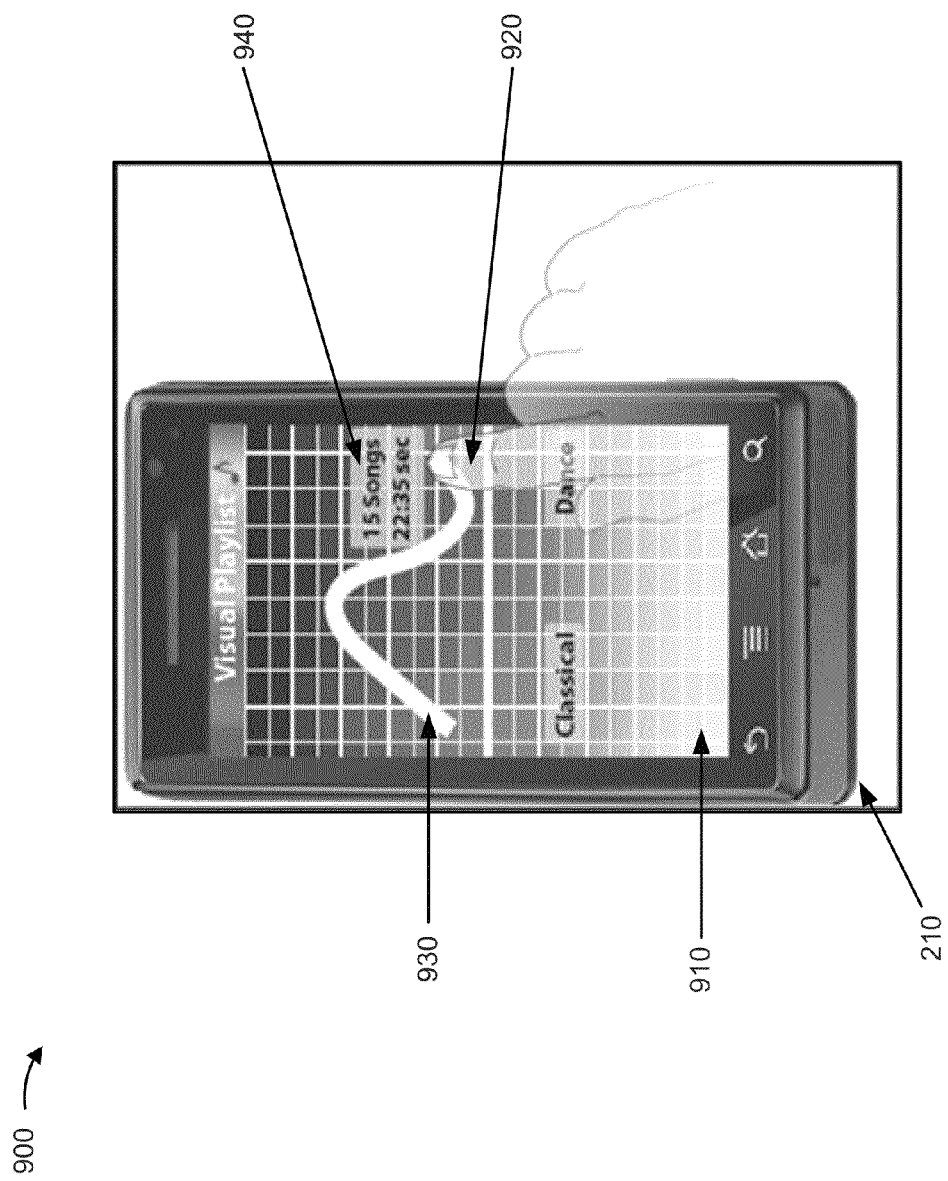

FIG. 9 is a diagram of an example implementation 900 relating to process 400 shown in FIG. 4. FIG. 9 depicts a user interface 910 that may be presented on user device 210. A user may use an input mechanism 920 to interact with user interface 910, which may present a selected cell indicator 930 and/or selected song information 940. In some implementations, user interface 910 may correspond to and/or provide similar functionality as user interface 610.

As shown in FIG. 9, a user may interact with user interface 910 using an input mechanism 920. In some implementations, input mechanism 920 may include a mouse and/or a cursor controlled by the mouse. Additionally, or alternatively, input mechanism 920 may include a mechanism to interact with a touch screen, such as a finger, a stylus, a pointer, etc. Functions described herein as being performed by swiping using a touch screen may also be performed by clicking and dragging using a mouse. Additionally, functions described herein as being performed by touching and holding before swiping (or other similar language) may also be performed by clicking and holding before dragging.

A user may select one or more cells on a grid presented by user interface 910. For example, a user may use their finger to swipe a pattern on a touch screen device, as illustrated by selected cell indicator 930. In some implementations, the user may swipe to select cells, or may touch and hold before swiping to select cells, as described herein in connection with FIG. 7. Additionally, or alternatively, a user may select individual cells one at a time.

Additionally, or alternatively, a user may use multiple swipes (or another input mechanism) to select multiple portions of the grid that are not adjacent to one another (e.g., that cannot be selected using a single swipe). In this scenario, user interface 910 may provide a mechanism for a user to indicate when the user has finished selecting songs using multiple swipes. For example, a user may swipe three times, and may hold a finger on the screen at the end of the last swipe, which may indicate that the user has finished selecting songs.

User interface 910 may present selected cell indicator 930 that indicates cells that the user has selected via input mechanism 920. For example, selected cell indicator 930 may present selected cells in a different manner than non-selected cells, such as by highlighting selected cells, presenting selected cells in a different color, outlining selected cells, changing an image presented on the selected cells, etc.

Selected cell indicator 930 may include a swipe pattern that covers cells that have been selected by the user. In some implementations, the user selection may include a portion of a cell. In this scenario, user device 210 may add all of the songs in the selected cell (e.g., the cell to which the selected portion belongs) to the playlist. Alternatively, user device 210 may determine a position of the selected portion in relation to the entire cell, and may add songs to the playlist based on the position of the selected portion. For example, if a cell represents three songs with a tempo of 100 bpm, 110 bpm, and 120 bpm, and the user selects the top third of the cell, user device 210 may only add the 120 bpm song to the playlist.

Selected song information 940 may present information associated with the selected songs. In some implementations, the information may be presented when a user indicates that the user has finished selecting songs (e.g., stops swiping, touching, dragging, etc.). Additionally, or alternatively, the information may be presented as a user selects the songs, and may be updated as new songs are selected. The presented information may identify one or more attributes of the selected songs, such as a quantity of selected songs, a combined length of the selected songs, etc.

User device 210 may receive an indication that a user has finished selecting songs. In some implementations, a user may swipe to select songs, and may hold their finger on the touch screen at the end of the swipe, which may indicate that the user has finished selecting songs. Additionally, or alternatively, user device 210 may prompt the user (e.g., when a user holds at the end of a swipe, when the user stops touching the touch screen, etc.), and may receive a response to the prompt to determine that the user has finished selecting songs. In some implementations, when a user selects one or more cells, user device 210 may present a list of songs represented by the selected cells, and may permit the user to play all of the listed songs or select one or more songs for playback.

In some implementations, a user may select songs to be played and/or added to a playlist using a first swipe, and may indicate the length of the playlist using a second swipe. For example, after user device 210 receives an indication that a user has finished selecting songs, user device 210 may prompt the user to indicate a length for the playlist. The user may use an input mechanism (e.g., a keyboard, a mouse, etc.) to indicate the length of the playlist. Additionally, or alternatively, the user may swipe on the screen of user device 210, with the length of the swipe representing the length of the playlist (e.g., a shorter swipe indicates a short playlist and a longer swipe indicates a longer playlist). User device 210 may randomly select a subset of the selected songs to be included in the playlist, based on the indicated length.

As an example, if a user would like to play slow tempo classical music, the user may select one or more cells from the bottom left portion of user interface 910. As another example, assume that a user wants to play music during a workout. The user may wish to start the workout with medium tempo classical songs that gradually increase in tempo and transition into fast tempo dance songs, and may wish to finish the workout with medium tempo dance songs. In order to create a playlist that meets these criteria, the user may swipe the pattern shown by selected cell indicator 930.

As another example, a user may swipe upward and then downward in a single column of user interface 910, which may cause user device 210 to play music of a single genre (e.g., classical music) that increases in tempo and then decreases in tempo. If the same cell is selected twice (e.g., once on the swipe up and once on the swipe down), user device 210 may divide the songs represented by the cell so that some of the songs are played in the first part of the playlist (e.g., as the tempo is increasing) and other ones of the songs are played in the second part of the playlist (e.g. as the tempo is decreasing). Similarly, a user may swipe left or right in a single row, which may cause user device 210 to play music of multiple genres that have a similar tempo (e.g., within a granularity interval, such as 20 bpm).

Figure 10:
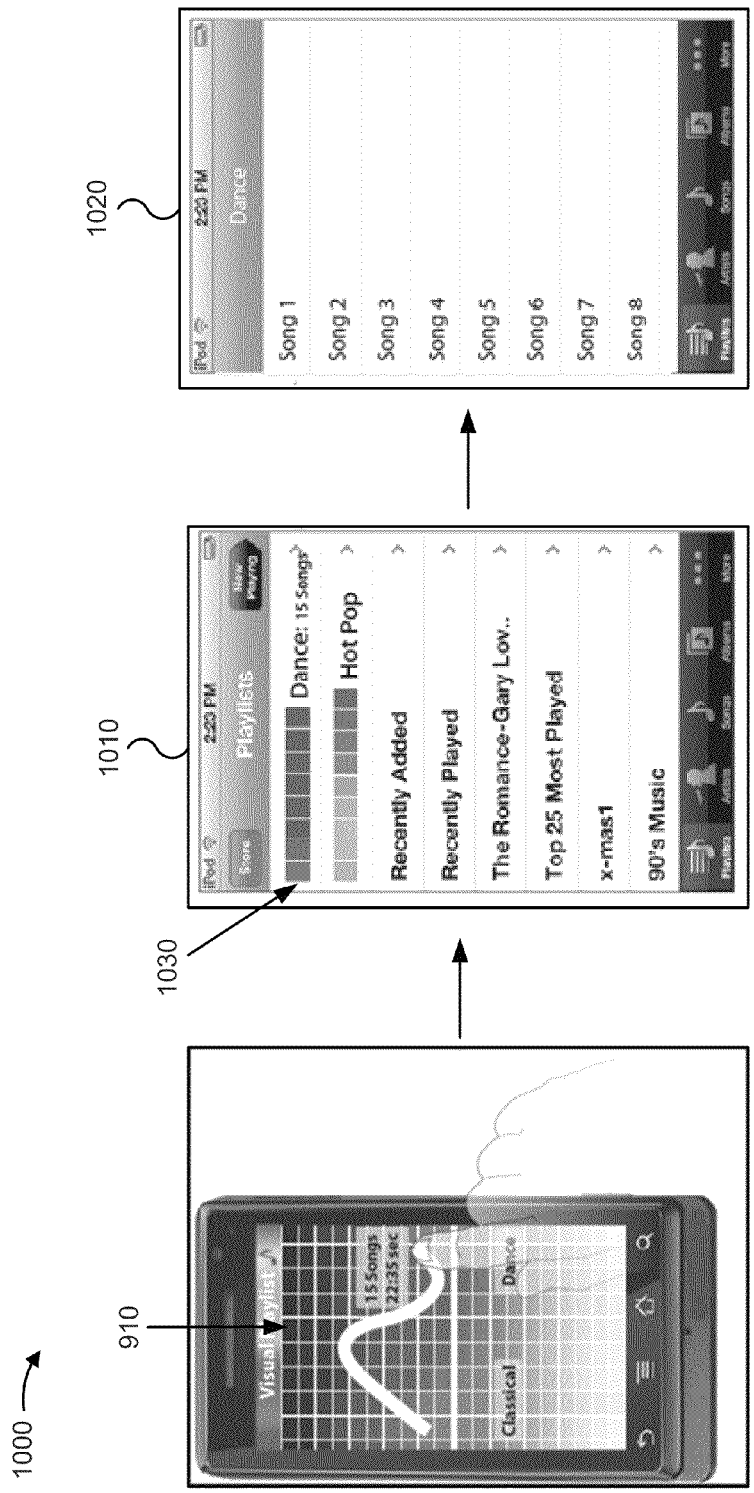

FIG. 10 is a diagram of an example implementation 1000 relating to the process shown in FIG. 4. FIG. 10 depicts user interface 910 (FIG. 9), and user interfaces 1010 and 1020 that may be used to create and/or play a playlist 1030.

As shown in FIG. 10, a user may select songs to include in a playlist via user interface 910, and may provide an indication that the user has finished selecting songs. Based on the indication, user device 210 may present user interface 1010 that presents the created playlist 1030. User interface 1010 may present information associated with playlist 1030. For example, user device 210 may create a name for playlist 1030 (e.g., "Dance: 15 songs") based on one or more attributes of the selected songs. The name may be based on an attribute associated with a majority of the selected songs (e.g., the majority of the songs may be classified into the dance genre) and/or associated with all of the selected songs (e.g., a quantity of selected songs). Additionally, or alternatively, user interface 1010 may present a representation of the cells that were selected to create playlist 1030 (as illustrated by the shaded rectangles to the left of the playlist name, "Dance"). In some implementations, user device 210 may store the created playlist 1030 so that the user does not have to select the songs again in the future.

The user may select playlist 1030, which may cause user device 210 to present the songs included in playlist 1030 and/or to play playlist 1030, as illustrated by user interface 1020. In some implementations, user device 210 may play playlist 1030 upon receiving an indication that the user has finished selecting songs (e.g., without requiring further selection of playlist 1030 via user interface 1010).

Implementations described herein simplify the playlist creation process by allowing a user to create a playlist by selecting a representation of a song or a group of songs presented on a two-dimensional grid that categorizes songs based on two or more attributes.

While certain implementations are described herein in connection with the attributes of tempo and genre, the described functions may be similarly implemented using any of the attributes described herein. Furthermore, while certain implementations are described herein in connection with songs, the described functions may be similarly implemented for audio other than songs, for video, and/or for other media content.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term "component" is intended to be broadly construed as hardware, firmware, or a combination of hardware and software.

Some implementations are described herein in conjunction with thresholds. The term "greater than" (or similar terms), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms).

Certain user interfaces have been described herein. In some implementations, the user interfaces may be customizable by a device. Additionally, or alternatively, the user interfaces may be pre-configured to a standard configuration, a specific configuration based on a type of device on which the user interfaces are presented, or a set of configurations based on capabilities and/or specifications associated with a device on which the user interfaces are presented.

It will be apparent that systems and/or methods, as described herein, may be implemented in many different forms of software, firmware, and hardware in the implementations illustrated in the figures. The actual software code or specialized control hardware used to implement these systems and/or methods is not limiting of the implementations. Thus, the operation and behavior of the systems and/or methods were described without reference to the specific software code—it being understood that software and control hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Further, the phrase "based on" is intended to mean "based, at least in part, on" unless explicitly stated otherwise.

What is claimed is:

1. A device, comprising:
one or more processors to:
receive information that identifies a first attribute and a second attribute associated with a plurality of audio files,
the first attribute and the second attribute specifying a manner in which the plurality of audio files are to be represented on a user interface,
the first attribute or the second attribute identifies at least one of:
a tempo associated with an audio file, of the plurality of audio files,
a genre associated with the audio file,
a date on which the audio file was released,
an artist associated with the audio file,
an album associated with the audio file,
a name of the audio file,
a length of the audio file,
a voice frequency associated with the audio file,
a mood associated with the audio file,
a rating of the audio file,
a quantity of times that a user has selected the audio file for playback,
a date that the user acquired or purchased the audio file,
a date on which the user last selected the audio file to be played,
a geographic region associated with the audio file, or
a musical instrument used in the audio file;
present, on the user interface and based on the first attribute and the second attribute, a representation of the plurality of audio files on a grid,
a first dimension of the grid being associated with the first attribute,
a second dimension of the grid being associated with the second attribute, and
the grid including a plurality of cells,
each of the plurality of cells representing one or more audio files, of the plurality of audio files, associated with one or more values of the first attribute and one or more values of the second attribute;
receive a selection of a portion of the grid corresponding to a set of audio files of the plurality of audio files, the selection forming a curved line across the portion of the grid;
determine, based on the curved line, that a cell, of the plurality of cells, has been selected a plurality of times,
the cell representing a first audio file, of the plurality of audio files, and a second audio file of the plurality of audio files, and
a first portion of the curved line being positioned across a portion of the cell associated with the first audio file and a second portion of the curved line being positioned across a portion of the cell associated with the second audio file;
create a playlist based on the selection,
the playlist including the set of audio files;
determine, based on the curved line, a trend associated with the selection; and
order the set of audio files, in the playlist, based on the trend,
the first audio file being included in a first part of the playlist based on the first portion of the curved line being associated with the first portion of the cell, and
the second audio file being included in a second part of the playlist based on the second portion of the curved line being associated with the second portion of the cell.

2. The device of claim 1,
where each cell, of the plurality of cells, is associated with a corresponding first value of a first set of values of the first attribute and a corresponding second value of a second set of values of the second attribute.

3. The device of claim 2, where the one or more processors are further to:
receive information identifying a granularity that specifies an interval,
where each cell, of the first plurality of cells, represents, based on the interval, one or more audio files, of the plurality of audio files, associated with an attribute value of the corresponding first value of the first set of values of the first attribute.

4. The device of claim 1, where the one or more processors, when presenting the representation of the plurality audio files on the grid, are further to:
present an audio file representation of the audio file at a first position in the first dimension and a second position in the second dimension,
where the first position is determined based on a first attribute value, of the first attribute, associated with the audio file, and
where the second position is determined based on a second attribute value, of the second attribute, associated with the audio file.

5. The device of claim 1, where the audio file includes a song, and the first attribute or the second attribute identifies at least one of:
a tempo of the song;
a genre of the song;
a date on which the song was released;
an artist associated with the song;
an album associated with the song;
a name of the song;
a length of the song;
a voice frequency associated with the song;
a mood associated with the song;
a rating of the song;
a quantity of times that a user has selected the song for playback;
a date that the user acquired or purchased the song;
a date on which the user last selected the song to be played;
a geographic region associated with the song; or
a musical instrument used in the song.

6. A method, comprising:
receiving, by a device, information that identifies a first attribute and a second attribute associated with a plurality of audio files,
  the first attribute and the second attribute specifying a manner in which the plurality of audio files are to be represented on a user interface of the device,
  the first attribute or the second attribute identifies at least one of:
    a tempo associated with an audio file of the plurality of audio files,
    a genre associated with the audio file,
    a date on which the audio file was released,
    an artist associated with the audio file,
    an album associated with the audio file,
    a name of the audio file,
    a length of the audio file,
    a voice frequency associated with the audio file,
    a mood associated with the audio file,
    a rating associated with the audio file,
    a quantity of times that a user has selected the audio file for playback,
    a date that the user acquired or purchased the audio file,
    a date on which the user last selected the audio file to be played,
    a geographic region associated with the audio file, or
    a musical instrument associated with the audio file;
presenting, by the device and based on the first attribute and the second attribute, a representation of the plurality of audio files for display on a grid,
  the grid including a plurality of cells,
    each of the plurality of cells representing one or more audio files, of the plurality of audio files, associated with one or more values of the first attribute and one or more values of the second attribute;
receiving, by the device, a selection of a portion of the grid corresponding to a set of audio files of the plurality of audio files,
  the selection forming a curved line across the portion of the grid;
determining, by the device and based on the curved line, that a cell, of the plurality of cells, has been selected a plurality of times,
  the cell representing a first audio file, of the plurality of audio files, and a second audio file of the plurality of audio files, and
  a first portion of the curved line being positioned across a portion of the cell associated with the first audio file and a second portion of the curved line being positioned across a portion of the cell associated with the second audio file;
creating, by the device and based on the selection, a playlist that includes the set of audio files; and
determining, by the device and based on the curved line formed across the portion of the grid, a trend associated with the selection; and
ordering, by the device, the set of audio files, in the playlist, based on the trend,
  the first audio file being included in a first part of the playlist based on the first portion of the curved line being associated with the first portion of the cell, and
  the second audio file being included in a second part of the playlist based on the second portion of the curved line being associated with the second portion of the cell.

7. The method of claim 6, where the first attribute is associated with a plurality of horizontal positions on the grid,
  where the second attribute is associated with a plurality of vertical positions on the grid, and
  where presenting the representation of the plurality of audio files on the grid includes:
    presenting an audio file representation of the audio file at a particular horizontal position, of the plurality of horizontal positions, and a particular vertical position, of the plurality of vertical positions,
      the particular horizontal position being determined based on a first attribute value, of the first attribute, associated with the audio file, and
      the particular vertical position being determined based on a second attribute value, of the second attribute, associated with the audio file.

8. The method of claim 6, where presenting the representation includes:
  presenting a plurality of positions on the grid,
    each position, of the plurality of positions, representing one or more audio files, of the plurality of audio files, associated with one or more values of the first attribute and one or more values of the second attribute.

9. The method of claim 8, where each position, of the plurality of positions, includes a cell, of the plurality of cells, positioned at a particular row and a particular column on the grid,
  the particular row including a group of the plurality of cells associated with the one or more values of the first attribute, and
  the particular column including a group of the plurality of cells associated with the one or more values of the second attribute.

10. The method of claim 9, further comprising:
  receiving information identifying a granularity associated with the grid,
    the granularity indicating a spacing, on the grid, between the group of the plurality of cells associated with the one or more values of the first attribute or the group of the plurality of cells associated with the one or more values of the second attribute.

11. The method of claim 6, the method further comprising:
  presenting, on the user interface and based on the selection, information associated with the set of audio files.

12. The method of claim 6, where the audio file includes a song, and
  where the first attribute or the second attribute identifies at least one of:
    a tempo associated with the song;
    a genre associated with the song;
    a date associated with the song;
    an artist associated with the song;
    an album associated with the song;
    a name associated with the song;
    a length associated with the song;
    a voice frequency associated with the song;
    a mood associated with the song;
    a rating associated with the song;
    a quantity of times that a user has selected the song for playback;
    a geographic region associated with the song; or
    a musical instrument associated with the song.

13. A non-transitory computer-readable medium storing instructions, the instructions comprising:
  one or more instructions that, when executed by a processor, cause the processor to:

receive information that identifies a first attribute and a second attribute associated with a plurality of songs,
the first attribute and the second attribute specifying a manner in which the plurality of songs are to be represented on a user interface,
the first attribute or the second attribute identifies at least one of:
a tempo of a song of the plurality of songs,
a genre of the song,
a date on which the song was released,
an artist associated with the song,
an album associated with the song,
a name of the song,
a length of the song,
a voice frequency associated with the song,
a mood associated with the song,
a rating of the song,
a quantity of times that a user has selected the song for playback,
a date that the user acquired or purchased the song,
a date on which the user last selected the song to be played,
a geographic region associated with the song, or
a musical instrument used in the song;
present, via the user interface and based on the first attribute and the second attribute, a representation of the plurality of songs on a grid,
the grid including a plurality of cells,
each of the plurality of cells representing one or more songs, of the plurality of songs, associated with one or more values of the first attribute and one or more values of the second attribute;
receive a selection of a portion of the grid corresponding to a set of songs of the plurality of songs,
the selection forming a curved line across the portion of the grid;
determine, based on the curved line formed across the portion of the grid, that a cell, of the plurality of cells, has been selected a plurality of times,
the cell representing a first song, of the plurality of songs, and a second song of the plurality of songs, and
a first portion of the curved line being positioned across a portion of the cell associated with the first song and a second portion of the curved line being positioned across a portion of the cell associated with the second song; and
present, based on the selection, a playlist, that includes the set of songs, on a display,
the set of songs being presented in an order determined based on the trend,
the first song being included in a first portion of the playlist based on the first portion of the curved line being associated with the first portion of the cell, and
the second song being included in a second portion of the playlist based on the second portion of the curved line being associated with the second portion of the cell.

14. The computer-readable medium of claim 13, where the one or more instructions to present the representation include:
one or more instructions that, when executed by the processor, cause the processor to:
present a plurality of positions on the grid,
each position, of the plurality of positions, representing one or more songs, of the plurality of songs, associated with one or more values of the first attribute and one or more values of the second attribute.

15. The computer-readable medium of claim 14, where each position, of the plurality of positions, includes a cell, of the plurality of cells, positioned at a particular row and a particular column on the grid,
where the particular row includes a group of the plurality of cells associated with the one or more values of the first attribute, and
where the particular column includes a group of the plurality of cells associated with the one or more values of the second attribute.

16. The computer-readable medium of claim 15, where the instructions further comprise:
one or more instructions that, when executed by the processor, cause the processor to:
receive information identifying a granularity associated with the representation,
the granularity indicating a distance, on the grid, between the group of the plurality of cells associated with the one or more values of the first attribute or the group of the plurality of cells associated with the one or more values of the second attribute.

17. The computer-readable medium of claim 16, where the instructions further comprise:
one or more instructions that, when executed by the processor, cause the processor to:
present, via the user interface and based on the selection, information associated with the set of songs.

18. The device of claim 3, where the first attribute identifies the tempo associated with the audio file, and
where the granularity specifies a quantity of beats per minute.

19. The device of claim 3, where the first attribute identifies the genre associated with the audio file, and
where the granularity specifies a quantity of genres to be associated with each cell.

20. The device of claim 3, where the first attribute identifies the date on which the audio file was released, and
where the granularity specifies a quantity of years associated with each cell.

* * * * *